United States Patent [19]

Langowski et al.

[11] Patent Number: 5,065,524
[45] Date of Patent: Nov. 19, 1991

[54] DEVICE FOR MEASURING THE INTERNAL DIAMETER OF TUBES

[75] Inventors: Andreas Langowski, Schramberg; Wolfgang Schultz, Tennenbronn; Gerhard Walter, Alpirsbach, all of Fed. Rep. of Germany

[73] Assignee: Mauser-Werke Oberndorf GmbH, Oberndorf, Fed. Rep. of Germany

[21] Appl. No.: 551,761

[22] Filed: Jul. 11, 1990

[30] Foreign Application Priority Data

Jul. 12, 1989 [DE] Fed. Rep. of Germany ....... 3922937

[51] Int. Cl.⁵ .............................................. G01B 5/12
[52] U.S. Cl. .................................. 33/544.2; 33/555.1; 33/544.5
[58] Field of Search ............... 33/784, 827, 542, 542.1, 33/544, 544.1, 544.2, 544.3, 544.5, 551, 555.1, 553, 549, 550, 551, 552, 553

[56] References Cited

U.S. PATENT DOCUMENTS

| | | | |
|---|---|---|---|
| 2,239,981 | 4/1941 | Terry et al. | 33/544.3 |
| 2,607,128 | 8/1952 | Newhall | 33/544.3 |
| 2,854,758 | 10/1958 | Owen | 33/544.3 |
| 2,864,173 | 12/1958 | Castel | 33/544.2 |
| 4,885,845 | 12/1989 | Yamamoto et al. | 33/784 X |

FOREIGN PATENT DOCUMENTS 3103819 12/1981 Fed. Rep. of Germany.
3238336 8/1987 Fed. Rep. of Germany.

Primary Examiner—Harry N. Haroian
Attorney, Agent, or Firm—McGlew & Tuttle

[57] ABSTRACT

The device for measuring the internal diameter of tubes 2 consisting of two interconnected measuring units 3 and 4 that are connected to one another. The first measuring unit 3 is formed by a measuring head 9 in conjunction with a displacement transducer 7, which is axially displaceable within a tube 2. The axial displacement of the measuring head 9 is determined by a length measuring device consisting of a friction wheel 25 associated with a rotation transducer. To achieve this, the friction wheel is in functional connection with a flexible tube 24 which is rigidly connected to the measuring head 9. Thus, this measuring device makes it possible to determine internal diameters at two positions located at axially spaced locations from one another in a tube 2.

8 Claims, 1 Drawing Sheet

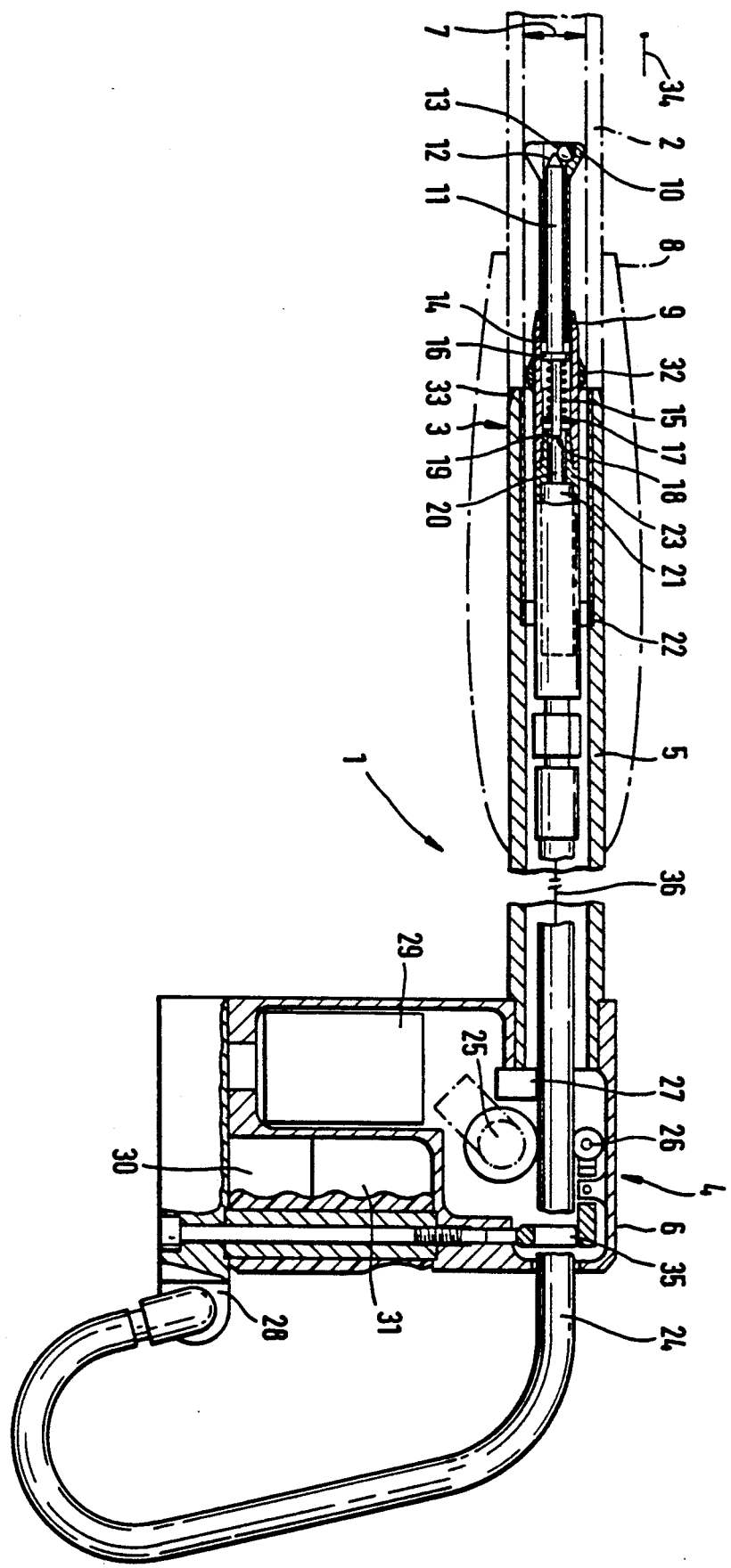

1

DEVICE FOR MEASURING THE INTERNAL DIAMETER OF TUBES

FIELD AND BACKGROUND OF THE INVENTION

The present invention pertains in general to a device for measuring the internal diameter of tubes, and in particular to measuring the caliber of the barrels of firearms. The device consisting essentially of a measuring head with radially acting calipers which are functionally connected to an axially movable, spring-tensioned rod that is in turn connected to a measuring and display unit.

A similar measuring device for measuring internal diameters, whose measuring head has a measuring transducer that is movable radially relative to the longitudinal axis of the measuring device, has been known from West German Patent No. 32,38,336 C2. The radial movement of the measuring transducer or calipers is transmitted to an axially movable rod which is in functional connection with a dial gage. The measuring rod is subject to the action of a spring.

West German Patent No. 31,03,819 A1 also discloses a similar instrument for measuring internal diameters. In this patent measuring tips are actuated by a mobile measuring system formed by a rod that is axially movable. The rod is subject to the action of a spring in this instrument as well and is in contact with the measuring tip of a dial gage. The radial movement of the measuring tips is transmitted to the measuring rod in an axial direction of movement and is reported to the measured value acquisition unit.

These prior-art conventional methods measure the internal diameter of tubes only after the tubes have been disassembled and the result can be strongly influenced by the person performing the measurement. Particularly disadvantageous is the fact that these prior-art measuring instruments are able to determine a dimension only at a defined measuring position determined in advance. Continuous measurement of the internal diameter of the tube at a plurality of points located at axially spaced locations from each other is impossible. However, measurement at a plurality of measuring points, located at axially spaced locations from each other, is of particularly great importance for measuring the caliber of firearm barrels. Another requirement is that such a firearm barrel must be measured in the installed state in a relatively rapid measuring operation even under extreme weather conditions, and the measurement should scarcely be influenced by the operating personnel.

SUMMARY AND OBJECTS OF THE INVENTION

The object of the present invention is to provide a device for measuring the internal diameter of tubes and especially the caliber of firearm barrels, which permits rapid and reliable measurement of a plurality of points located at axially spaced locations from one another in the tube and which cannot practically be influenced by the operating personnel.

This is accomplished, according to the present invention, so that the measuring head is arranged movably in a tubular housing. A calibrating cylinder with an internal diameter corresponding to the normal diameter of the tube can be used to calibrate the measuring head. The axial travel path is determined by an integrating length measuring device, and the measuring head and the length measuring device are connected to a common measuring and evaluating unit.

According to the present invention, the measuring head may have a displacement transducer which is connected mechanically to the length measuring device and electrically to the common measuring and evaluating unit.

In another embodiment of the present invention, the measuring head may be connected to an elastic or flexible shaft, whose axial movement is recorded with a friction wheel. An electrical line from the displacement transducer of the measuring head to the common measuring unit is placed into the shaft, and a limit switch for determining the position of the calibration process, which is also functionally connected to the measuring and evaluating unit, comes into contact with the shaft.

Finally, the tubular housing for receiving the measuring head and the displacement transducer may be connected to the housing for the length measuring device and for the measuring and evaluating unit. The end face of the tubular housing abuts against the front end face of the barrel and is axially guided in an adapter or in the muzzle brake of the barrel in the case of firearm barrels.

According to the present embodiment the above-described task is accomplished with these characteristics in the following optimal manner. In the starting position before the beginning of the measurement, the measuring head is located in the tubular housing. Where the measured values of both the measuring head and the calibrating cylinder are reset to zero by means of a calibrating cylinder and a limit switch. When the measuring head is pushed axially through the tube to be measured by means of the flexible rubber shaft, the friction wheel reports, with a rotation transducer, the positions reached to the measured value evaluating unit after predetermined distances, and the calibrated dimension is compared to a stored measured value associated with the position identified in the measured value evaluating unit. Thus, both the internal diameters and their positions at axially spaced locations from one another are accurately measured and compared with stored nominal values in one operation with this measuring device. The measured value evaluating unit and a display unit or printer connected to it make the measuring result obtained known to the operator.

A further of the object of the invention is to provide a internal diameter measuring device which is simple in design, rugged in construction and economical to manufacture.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which a preferred embodiment of the invention is illustrated.

BRIEF DESCRIPTION OF THE DRAWING

In the drawing:

FIG. 1 is a sectional view of the device for measuring the internal diameter of tubes.

DESCRIPTION OF THE EMBODIMENT

The device 1 for measuring the internal diameter of tubes 2 consists essentially of two different measuring units 3 and 4, which are inserted in interconnected radial measurement unit housing 15 and axial measurement unit housing 6. FIG. 1 shows the measuring device 1 during use for measuring the internal diameter or caliber 7 of a firearm barrel 2 with a muzzle brake 8.

The measuring unit 3 consists of a measuring head 9 formed by radially movable measuring calipers or probes 10, whose radial movement is brought about by a rod 11 whose front conical tip 12 abuts against a spreading member 13, e.g., a ball. The rod 11 is placed into a cylindrical housing 14 and is under the action of a compression spring 15 which is supported by a shoulder 16 of the rod 11, on one end, and a ring 17 in the cylindrical housing 14, on the other end. The rear end face 18 of the rod 11 abuts against the front end face 19 of a pin 20 of a displacement transducer 21. The measuring head 9 and the displacement transducer 21 are located and arranged axially displaceably in the tubular housing 5.

Furthermore, a calibrating cylinder 22, whose internal diameter corresponds to the internal diameter of the tube to be measured, is provided in the tubular housing 5.

The displacement transducer 21 is installed within a housing 23 whose rear end is connected to a flexible shaft 24. The shaft 24 is guided axially through the tubular housing 5 and enters into the housing 6 of the second measuring unit 4. The mantle surface of the shaft 24 is in functional connection with a friction wheel 25, which is connected to a rotation transducer 26 for transforming a mechanical movement into an electrical signal. The jacket surface of the shaft 24 is also connected to a limit switch 27. The end of the shaft 24 is attached to a projection or flange 28 of the housing 4.

In addition, a microprocessor 29 and a power supply unit 30, as well as a display unit 31 are accommodated in the housing 4. A display unit may also be installed outside the housing, in which case the measured value evaluating unit with the microprocessor 29 is electrically connected to a display unit and, if desired, a printer.

Before beginning the measurement of an internal diameter of a tube 2, the measuring head 9 with the measuring calipers 10 is located within the tubular housing 5. The calibration is first performed here, which means that the measuring calipers are adjusted to the internal dimension of the calibrating cylinder 22. The tubular housing 5 is then placed on the front end 33 of the tube 2. This position is reset to zero by the limit switch together with the calibration dimension. The measuring head 9 is subsequently displaced in the direction of arrow 34, guided radially and axially within the muzzle brake 8 shown in the examples. The muzzle brake may also be a corresponding adapter of tube 2. Previously identified measuring positions, which have been entered into the microprocessor 29, are passed over during this axial movement of the measuring head 9. This axial movement in the direction of arrow 34 is recorded by the friction wheel 25 associated with the rotation transducer 26 and is reported as a linear measurement to the microprocessor 29. The internal diameter 7 of the tube 2 is also determined at the same time when passing over the previously identified measuring portions in the tube 2. The measured value evaluating unit with the microprocessor 29 compares the dimensions measured with a stored nominal value of the corresponding position in the tube 2 and signals the result as "good" or "bad" by means of light-emitting diodes of different colors. The dimensions measured are, of course, also recorded in terms of absolute values in order to permit comparison with a predetermined actual value curve.

It is necessary to measure the caliber at a plurality of measuring points located at positions axially spaced from each other especially in case of firearm barrels, because the fitness of the firearm barrel can be evaluated on the basis of internal diameter. Because of the given conditions, such a measurement of firearm barrels must be able to be carried out rapidly. The measurement must not be practically influenced by the operating personnel, and the measurement must be able to be performed even under extreme weather conditions, without removal of the barrel from the firearm. The device for measuring the internal diameter of tubes according to the present embodiment consists, of two different measuring systems, whose measured values are linked with each other in a permanently programmed measured value evaluating unit. The measuring head 9 first has the task of converting the calibration dimension into an axial movement. This is brought about by the axial movement of the rod 11 within the measuring caliper that is moving in the radial direction during the measurement process. The axial movement of the rod 11 acts against the pin 20 of the measuring transducer 21, thus representing internal diameter measured in defined axial positions. The compression spring 15 provides for an adjusted measuring force. The displacement transducer 21 converts the axial movement into an electrical signal and is connected to the basic instrument 4 via a flexible rubber shaft 24. The rubber shaft 24 serves both to carry the measuring head 9 and to receive an electrical signal cable 36, which is led from the displacement transducer 21 to the electrical measured value evaluating unit with the microprocessor 29.

The instantaneous position of the measuring head 9 relative to the tube opening 33 is determined via the friction wheel 25 and the rotation transducer connected thereto, which converts the mechanical movement of the shaft 24 into an electrical signal. The tubular housing 5 makes it possible to determine the position in axial and radial directions relative to the tube opening 33. The housing 6 for receiving the second measuring unit 4 can be made of aluminum and is rigidly connected to the tubular housing 5. Besides the length measuring device 25, the housing serves for protectively accommodating the measured value evaluating unit with the microprocessor 29 and the electrical power supply unit 30.

While a specific embodiment of the invention has been shown and described in detail to illustrate the application of the principles of the invention, it will be understood that the invention may be embodied otherwise without departing from such principles.

What is claimed is:

1. A device for measuring the internal diameter of a tube, comprising:
   a measuring head with radially acting calipers;
   a rod in said measuring head an in contact with said radially acting calipers, said rod moving axially in proportion to radial movement of said radially acting calipers;
   spring tension means, connected to said measuring head for biasing said rod into contact with said calipers and urging said calipers radially outwardly;
   a tubular housing defining a measuring head receiving space, and containing said measuring head in an axially moveable manner in said measuring head space;

a shaft connected to said measuring head for moving said measuring head axially in said tubular housing and in the tube to be measured; and measuring means for measuring movement of said shaft and said rod.

2. A device in accordance with claim 1, wherein:

said calibrating cylinder is interchangeable and said evaluating unit can be calibrated for different calibrating cylinders having different internal diameters.

3. A device in accordance with claim 2, further comprising:

two calibrating cylinders; and one of said calibrating cylinders having a minimum internal diameter and the other a maximum internal diameter for the tubes to be measured.

4. A device for measuring the internal diameter of a tube, comprising:

a measuring head with radially acting calipers;

a rod in said measuring head and in contact with said radially acting calipers, said rod moving axially in proportion to radial movement of said radially acting calipers;

spring tension means, connected to said measuring head for biasing said rod into contact with said calipers and urging said calipers radially outwardly;

a tubular housing defining a measuring head receiving space, and containing said measuring head in an axially moveable manner in said measuring head space;

a shaft connected to said measuring head for moving said measuring head axially in said tubular housing an in the tube to be measured;

a displacement transducer mechanically connected to said rod, for measuring movement of said rod and generating electrical signals proportional to movement of said rod;

measuring means for measuring movement of said shaft;

an evaluating unit for processing measurements taken by said measuring means and said displacement transducer;

a calibrating cylinder inside said tubular housing having an internal diameter corresponding to the nominal internal diameter of the tube, said measuring head being moveable through said calibrating cylinder; and said evaluating unit being calibrated when said moveable head is in said calibrating cylinder.

5. A device in accordance with claim 4, further comprising:

a friction wheel detecting movement of said shaft;

an electric line connecting said displacement transducer to said evaluation unit is contained inside said shaft; and a limit switch scanning said shaft for determining a position of said measuring head during calibration of said evaluation unit, and being functionally connected to the measuring unit.

6. A device in accordance with claim 5, wherein:

said limit switch also resets and starts said evaluation unit.

7. A device in accordance with claim 4, further comprising:

an axial measuring unit housing connected to said tubular housing, said axial measuring unit housing containing said measuring means; and means for guiding said tubular housing axially and radially towards an open end of the tube.

8. A process for measuring the entire internal diameter of a firearm barrel, the process comprising the steps of:

moving an internal diameter measuring device from one end of the firearm barrel to the other;

measuring the internal diameter of the firearm barrel and the axial position of said measuring device simultaneously; and processing both measurement to determine the entire internal diameter.

* * * * *